US012768595B2

(12) United States Patent
Dhayal et al.

(10) Patent No.: US 12,768,595 B2
(45) Date of Patent: Oct. 20, 2026

(54) METHOD AND SYSTEM OF PREDICTING SAFE TIME OF OPERATION FOR A ROTARY KILN

(71) Applicant: Tata Consultancy Services Limited, Mumbai (IN)

(72) Inventors: Akanksha Dhayal, Pune (IN); Sivakumar Subramanian, Pune (IN); Venkataramana Runkana, Pune (IN); Mohammed Suhail, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 281 days.

(21) Appl. No.: 18/799,311

(22) Filed: Aug. 9, 2024

(65) Prior Publication Data

US 2025/0085054 A1 Mar. 13, 2025

(30) Foreign Application Priority Data

Sep. 8, 2023 (IN) ............................ 202321060568

(51) Int. Cl.
*F27B 7/42* (2006.01)
*F27D 21/00* (2006.01)

(52) U.S. Cl.
CPC ................ *F27B 7/42* (2013.01); *F27D 21/00* (2013.01)

(58) Field of Classification Search
CPC . F27B 7/42; F27D 21/00; F27D 25/00; F27D 2021/0092; F27D 21/0021
See application file for complete search history.

(56) References Cited

U.S. PATENT DOCUMENTS

2018/0106683 A1* 4/2018 Singh ...................... G01K 7/34

FOREIGN PATENT DOCUMENTS

CN 115983145 A * 4/2023

OTHER PUBLICATIONS

Gareau, "A CFD Study of the Effects of Rings on Flow and Temperature in Lime Kilns," (2020).
Zhao et al., "Formation and Growth Behavior Analysis of Slagging Rings in Rotary Kiln-Type Hazardous Waste Incineration Systems," Energies, 14 (2021).

* cited by examiner

*Primary Examiner* — Charles Cai
(74) *Attorney, Agent, or Firm* — Finnegan, Henderson, Farabow, Garrett & Dunner, LLP

(57) ABSTRACT

This disclosure relates generally to a method and system for predicting safe time of operation for a rotary kiln. Over the period of time, the rotary kiln develops a ring within the inner walls of the kiln and suffers sudden shut down due to choking of the kiln. State-of-the-art methods provide the various methods of predicting safe time of operation, but the prediction is based on limited features and hence suffers accuracy. The disclosed method predicts safe time of operation for a rotary kiln based on mathematical model that estimates size of ring by estimating plurality of derived parameters based on operational parameters and design parameters. The derived parameters are the estimations provided by a solid bed height variation model, a gas stream model, a solid stream, a melt model, an agglomeration model, a volatile model, and a ring formation model.

20 Claims, 7 Drawing Sheets

METHOD AND SYSTEM OF PREDICTING SAFE TIME OF OPERATION FOR A ROTARY KILN

PRIORITY CLAIM

This U.S. patent application claims priority under 35 U.S.C. § 119 to: Indian Patent Application No. 202321060568, filed on Sep. 8, 2023. The entire contents of the aforementioned application are incorporated herein by reference.

TECHNICAL FIELD

The disclosure herein generally relates to a method of predicting safe time of operation for a rotary kiln, and, more particularly, to estimate ring formation within the lumen of the rotary kiln that predicts safe time of operation for the rotary kiln.

BACKGROUND

Pyro processing is a process in which materials are subjected to high temperatures (typically over 800° C.) in order to bring about a chemical or physical change. Pyro processing includes such terms as ore-roasting, calcination and sintering. Equipment for pyro processing includes kilns/rotary kiln, electric arc furnaces and reverberatory furnaces. Cement manufacturing is a very common example of pyro processing. The raw material mix (raw meal) after preheating is fed to a kiln where pyro processing takes place. As with most industries, pyro processing is the most energy-intensive part of the industrial process.

A rotary kiln is a processing device used to raise materials to a high temperature in a continuous process. Materials produced using rotary kilns include cement, lime, refractories, metakaolin, titanium dioxide, alumina, vermiculite, and iron ore pellets. The rotary kilns are also used for roasting a wide variety of sulfide ores prior to metal extraction. The rotary kiln is a cylindrical reactor that rotates at a constant rotational speed to mix the material inside the kiln and also transport them along them the kiln in a continuous process. The rotary kiln has an opening for receiving raw materials to be processed, known as feed end, and another opening at the end for releasing the processed material, known as discharge end. The movement of raw material happens from the feed end to the discharge end and fuel/hot gases move from the discharge end to the feed end. Due to such mechanism, temperature of the rotary kiln is not constant, but it varies along the length of the kiln. During cement making in the rotary kiln, raw materials interact with each other transforming both chemically and physically along the length and form aggregates due to the formed molten phase. Initially the aggregates e formed as a result of interaction of raw materials under high temperature of the kiln are relatively softer. But as the aggregates travel and cools towards the discharge end, it becomes comparatively harder because of re-crystallization and grain growth caused by varying temperatures along the length of the kiln. The size of the aggregates depends primarily on the melt formed in the mixture that acts as a binder for the particles to grow by sticking to one another. In addition to particles sticking to one another, they also stick to the walls of the kiln aided by the melt and the availability of fine particles. These sticking layers of particles form rings inside the rotary kiln and over the period of time it thickens the walls of the rotary kiln causing a decrease in the effective area for material mixing and movement. This causes obstruction in the efficient operation of the rotary kilns and sometimes leads to untimely shut down as the rotary kiln leading to several days of production loss. Several mathematical models have been proposed to study the reaction kinetics, heat, and mass balance inside the rotary kiln for better understanding of the process. Predicting safe time of operation gives an indication about the health of the kiln wherein it is assumed that the rotary kiln is healthy at a specific point of time when the ring size is within the tolerance limit. Attempts have been made to derive mathematical models for estimating the ring size and thus predicting the safe time of operation.

Many researchers have studied the aggregation process for different industries using population balance modelling (PBM). The PBM considered the effect of binders for stacking the fine particles upon bigger nuclei particles to form aggregates.

SUMMARY

Embodiments of the present disclosure present technological improvements as solutions to one or more of the above-mentioned technical problems recognized by the inventors in conventional systems. For example, in one embodiment, a method predicting safe time of operation for the rotary kiln is provided. The method includes receiving, via one or more hardware processors, a plurality of operational parameters and a plurality of design parameters of the rotary kiln. The plurality of design parameters comprises of kiln tilt angle, angle of repose for solid material, the radius of the rotary kiln, refractory thickness, refractory thermal conductivity, and rotational speed of the kiln and wherein operational parameters comprises of solid feed rate, temperature of kiln at the feed end, discharge end, at the middle, within the lumen of the kiln and near the walls of the rotary kiln. The method further includes obtaining, via one or more hardware processors, a plurality of derived parameters by processing one or more operational and design parameters using, a set of models, the set of models comprises the solid bed height variation model, the solid stream model, the gas stream model, the melt model, the aggregation model, and the volatile model. The method further includes obtaining, via one or more hardware processors, plurality of height parameters via solid bed height variation model. The solid bed height variation model estimates the height of the solid bed by assuming a certain bed height at the discharge end as an initial condition and subsequently calculating the solid bed height parameters along the length that varies from the discharge end to the feed end. The solid bed height parameters predict cross-section area of the solid stream, gas stream and available interfacial heat transfer area in between solids, gases, and kiln walls. The method further includes obtaining, via one or more hardware processors, a plurality of gaseous phase parameters via a gas stream model. The gas stream model estimates a gaseous phase parameters associated with a plurality of gaseous components of the gas stream introduced through the discharge end of the rotary kiln. The gas stream model calculates reaction kinetics of the plurality of gaseous components of the gas stream to obtain overall heat balance, wherein a part of gaseous components is introduced through a fuel injected from the discharge end and a part of gaseous components are obtained through the reactions of the solid bed triggered by high kiln temperature. The method further includes obtaining, via one or more hardware processors, a plurality of reaction kinetics and temperature parameters of the solid bed via solid stream model. The solid stream model simultaneously estimates the reaction kinetics of the solid bed associated with a plurality of components formed in the rotary kiln as a result of plurality of reactions occurring within various components of the solid bed and a molten phase formed within the rotary kiln, and also it estimates temperature parameters of the solid bed and the kiln walls by aggregating the obtained reaction kinetics and overall heat balance in the rotary kiln. The method further includes obtaining, via one or more hardware processors, energy parameters via melt model. The melt model estimates rate of formation of molten phase by calculating energy parameter associated with the total available solid material along the length of the kiln. The melt model estimates the rate of formation of the molten phase as the solid feed travels towards discharge end. Once the molten phase start forming in the kiln, the aggregation of the solid particles starts and grow along the kiln. The method further includes obtaining, via one or more hardware processors, a plurality of interaction parameters via aggregate model. The aggregate model calculates the rate of interaction among particles of the solid bed and molten phase forming an aggregate by obtaining interaction parameters. The aggregation model estimates the particle size distribution by calculating the rate of change in number of particles a general population balance model of a continuous system with constant volume, discretized in volume domain and the coalescence kernel is utilized in making such approximation. The method further includes obtaining, via one or more hardware processors, a plurality of state parameters via volatile model. The volatile model estimates the flow rate of volatile compounds circulating in the rotary kiln; and the deposition rate of the volatile compounds at the inner walls of the rotary kiln forming a ring. The volatile compounds iteratively experience change in state parameters along the length of the rotary kiln causing deposition and re-circulation. The volatile model focuses on volatile components introduced in the rotary kiln with the feed and fuel. Major components among those are alkali, potassium, chloride, and sulfur. There are other heavy metals also in the feed and fuel streams but in less quantity. These volatile components form complex compounds by interacting with each other and clinker material around them. These volatile materials can cause operation problems in the system by circulating within the kiln and reaching higher concentrations. The quality of the clinker also can be compromised with high content of volatile compounds in the feed and these materials take part in the inlet ring formation in the kiln and build-ups in the preheater cyclones that causes the unsteady material flow and frequent blockage of the cyclone. Therefore, the state parameters estimated by the volatile model are utilized in predicting safe time of operation for the rotary kiln. The net flow rate of the volatile compounds inside the rotary kiln is calculated by adding (i) net deposition rate of volatile compounds at the inner walls of the rotary kiln, (ii) circulation rate of low melting volatile compounds evaporating with the increasing temperature of the solid bed along the length of the kiln and re-circulating with gas stream in the kiln, and (iii) the high boiling volatile compounds remained trapped in the solid bed and exiting along with the discharged product.

The method further includes predicting, via one or more hardware processors, safe time of operation for the rotary kiln by aggregating output by a ring formation model, the set of height parameters, the gaseous phase parameters, the temperature parameter, the energy parameter, the interaction parameters, and the state parameters to estimate ring thickness, net ring growth and strength of the deposited material in the rotary kiln to predict safe time of operation of the rotary kiln. The ring formation model is a dynamic model and is solved for the process in the time intervals to estimate the ring thickness, ring growth rate, and strength of the deposited material in the kiln to predict the safe process time to operate the plant without unsteady flow and blockage. To solve the ring formation model, parameters from the rotary kiln model are first simulated such as internal temperatures, clinker phase concentrations, melt fraction, outer shell temperature and solid size distribution. With the help of the internal temperatures and outer shell temperature, the overall heat transfer term is computed along with the effective conductivity of the wall assuming an overall composite wall. This composite wall includes the refractory wall, coating wall with thickness, and outer shell. And this effective conductivity plays an important role in calculating the thickness of the deposited build-up in the form of rings at the inner wall and the same information is transferred to the ring formation model for the model tunning. After this step, the calculated ring formation rate is used to estimate the build-up rate (dGn/dt) and time to reach the ultimate coating to block the flow inside the rotary kiln.

In another aspect, a system for predicting the safe time of operation for the rotary kiln is provided. The system includes at least one memory storing programmed instructions; one or more Input/Output (I/O) interfaces; and one or more hardware processors, a plurality of rotary kiln model and a ring formation model, operatively coupled to a corresponding at least one memory, wherein the system is configured to receive, via the one or more hardware processors, a request to receive, via one or more hardware processors, a plurality of operational parameters and a plurality of design parameters of the rotary kiln. The plurality of design parameters comprises of kiln tilt angle, angle of repose for solid material, the radius of the rotary kiln and rotational speed of the kiln and wherein operational parameters comprises of solid feed rate, solid flow rate, temperature of kiln at the feed end, discharge end, at the middle, within the lumen of the kiln and near the walls of the rotary kiln. Further, the system is configured to obtain, via the one or more hardware processors, a plurality of derived parameters by processing one or more operational and design parameters using, a set of models, the set of models comprises the solid bed height variation model, the solid stream model, the gas stream model, the melt model, the aggregation model, and the volatile model. Further, the system is configured to obtain, via the one or more hardware processors, the plurality of height parameters via solid bed height variation model. The solid bed height variation model estimates the height of the solid bed by assuming a certain bed height at the discharge end as an initial condition and subsequently calculating the solid bed height parameters along the length that varies from the discharge end to the feed end. The solid bed height parameters predict cross-section area of the solid stream, gas stream and available interfacial heat transfer area in between solids, gases, and kiln walls. Further, the system is configured to obtain, via the one or more hardware processors, a plurality of gaseous phase parameters via a gas stream model. The gas stream model estimates a gaseous phase parameters associated with a plurality of gaseous components of the gas stream introduced through the discharge end of the rotary kiln. The gas stream model calculates reaction kinetics of the plurality of gaseous components of the gas stream to obtain overall heat balance, wherein a part of gaseous components is introduced through a fuel injected from the discharge end and a part of gaseous components are obtained through the reactions of the solid bed triggered by high kiln temperature. Further, the system is configured to obtain, via the one or more hardware processors, a plurality of reaction kinetics and temperature parameters of the solid bed via solid stream model. The solid stream model simultaneously estimates the reaction kinetics of the solid bed associated with a plurality of components formed in the rotary kiln as a result of plurality of reactions occurring within various components of the solid bed and a molten phase formed within the rotary kiln, and also it estimates temperature parameters of the solid bed and the kiln walls by aggregating the obtained reaction kinetics and overall heat balance in the rotary kiln. Further, the system is configured to obtain, via the one or more hardware processors, the plurality of energy parameters via melt model. The melt model estimates rate of formation of molten phase by calculating energy parameter associated with the total available solid material along the length of the kiln. The melt model estimates the rate of formation of the molten phase as the solid feed travels towards discharge end. Once the molten phase start forming in the kiln, the aggregation of the solid particles starts and grow along the kiln. Further, the system is configured to obtain, via the one or more hardware processors, the plurality of interaction parameters via aggregate model. The aggregate model calculates the rate of interaction among particles of the solid bed and molten phase forming an aggregate by obtaining interaction parameters. The aggregation model estimates the rate of interaction among particles by approximating particle size distribution using a general population balance model of a continuous system with constant volume, discretize in volume domain and the coalescence kernel is utilized in making such approximation. Further, the system is configured to obtain, via the one or more hardware processors, the plurality of state parameters via volatile model. The volatile model estimates the flow rate of volatile compounds circulating in the rotary kiln; and the deposition rate of the volatile compounds at the inner walls of the rotary kiln forming a ring. The state parameters estimated by the volatile model are utilized in predicting safe time of operation for the rotary kiln. The net flow rate of the volatile compounds inside the rotary kiln is calculated by adding (i) net deposition rate of volatile compounds at the inner walls of the rotary kiln, (ii) circulation rate of low melting volatile compounds evaporating with the increasing temperature of the solid bed along the length of the kiln and re-circulating with gas stream in the kiln, and (iii) the high boiling volatile compounds remained trapped in the solid bed. Further, the system is configured to predict, via the one or more hardware processors, the safe time of operation for the rotary kiln by aggregating by a ring formation model, the set of height parameters, the gaseous phase parameters, the temperature parameter, the energy parameter, the interaction parameters and the state parameters to estimate ring thickness, net ring growth and strength of the deposited material in the rotary kiln to predict safe time of operation of the rotary kiln.

In yet another aspect, a computer program product including a non-transitory computer-readable medium having embodied therein a computer program for predicting safe time of operation for the rotary kiln is provided. Further, the computer readable program, when executed on a computing device, causes the computing device to receive, via the one or more hardware processors, the plurality of operational parameters and a plurality of design parameters of the rotary kiln. The plurality of design parameters comprises of kiln tilt angle, angle of repose for solid material, the radius of the rotary kiln and rotational speed of the kiln and wherein operational parameters comprises of solid feed rate, solid flow rate, temperature of kiln at the feed end, discharge end, at the middle, within the lumen of the kiln and near the walls of the rotary kiln. Further, the computer readable program, when executed on a computing device, causes the computing device to obtain, via the one or more hardware processors, the plurality of derived parameters by processing one or more operational and design parameters using, a set of models, the set of models comprises the solid bed height variation model, the solid stream model, the gas stream model, the melt model, the aggregation model, and the volatile model. Further, the computer readable program, when executed on a computing device, causes the computing device to obtain, via the one or more hardware processors, the plurality of height parameters via solid bed height variation model. The solid bed height variation model estimates the height of the solid bed by assuming a certain bed height at the discharge end as an initial condition and subsequently calculating the solid bed height parameters along the length that varies from the discharge end to the feed end. The solid bed height parameters predict cross-section area of the solid stream, gas stream and available interfacial heat transfer area in between solids, gases and kiln walls. Further, the computer readable program, when executed on a computing device, causes the computing device to obtain, via the one or more hardware processors, the plurality of gaseous phase parameters via a gas stream model. The gas stream model estimates a gaseous phase parameters associated with a plurality of gaseous components of the gas stream introduced through the discharge end of the rotary kiln. The gas stream model calculates reaction kinetics of the plurality of gaseous components of the gas stream to obtain overall heat balance, wherein a part of gaseous components is introduced through a fuel injected from the discharge end and a part of gaseous components are obtained through the reactions of the solid bed triggered by high kiln temperature. Further, the computer readable program, when executed on a computing device, causes the computing device to obtain, via the one or more hardware processors, the plurality of reaction kinetics and temperature parameters of the solid bed via solid stream model. The solid stream model simultaneously estimates the reaction kinetics of the solid bed associated with a plurality of components formed in the rotary kiln as a result of plurality of reactions occurring within various components of the solid bed and a molten phase formed within the rotary kiln, and also it estimates temperature parameters of the solid bed and the kiln walls by aggregating the obtained reaction kinetics and overall heat balance in the rotary kiln. Further, the computer readable program, when executed on a computing device, causes the computing device to obtain, via the one or more hardware processors, the plurality of energy parameters via melt model. The melt model estimates rate of formation of molten phase by calculating energy parameter associated with the total available solid material along the length of the kiln. The melt model estimates the rate of formation of the molten phase as the solid feed travels towards discharge end. Once the molten phase start forming in the kiln, the aggregation of the solid particles starts and that grow along the kiln. Further, the computer readable program, when executed on a computing device, causes the computing device to obtain, via the one or more hardware processors, the plurality of interaction parameters via aggregate model. The aggregate model calculates the rate of interaction among particles of the solid bed and molten phase forming an aggregate by obtaining interaction parameters. The aggregation model estimates the rate of interaction among particles by approximating particle size distribution using a general population balance model of a continuous system with constant volume, discretize in volume domain and the coalescence kernel is utilized in making such approximation. Further, the computer readable program, when executed on a computing device, causes the computing device to receive, via the one or more hardware processors, the plurality of state parameters via volatile model. The volatile model estimates the flow rate of volatile compounds circulating in the rotary kiln; and the deposition rate of the volatile compounds at the inner walls of the rotary kiln forming a ring. The state parameters estimated by the volatile model is utilized in predicting safe time of operation for the rotary kiln. The net flow rate of the volatile compounds inside the rotary kiln is calculated by adding (i) net deposition rate of volatile compounds at the inner walls of the rotary kiln, (ii) circulation rate of low melting volatile compounds evaporating with the increasing temperature of the solid bed along the length of the kiln and re-circulating with gas stream in the kiln, and (iii) the high boiling volatile compounds remained trapped in the solid bed. Further, the computer readable program, when executed on a computing device, causes the computing device to obtain, via the one or more hardware processors, the system is configured to predict, via the one or more hardware processors, the safe time of operation for the rotary kiln by aggregating by a ring formation model, the set of height parameters, the gaseous phase parameters, the temperature parameter, the energy parameter, the interaction parameters and the state parameters to estimate ring thickness, net ring growth and strength of the deposited material in the rotary kiln to predict safe time of operation of the rotary kiln.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
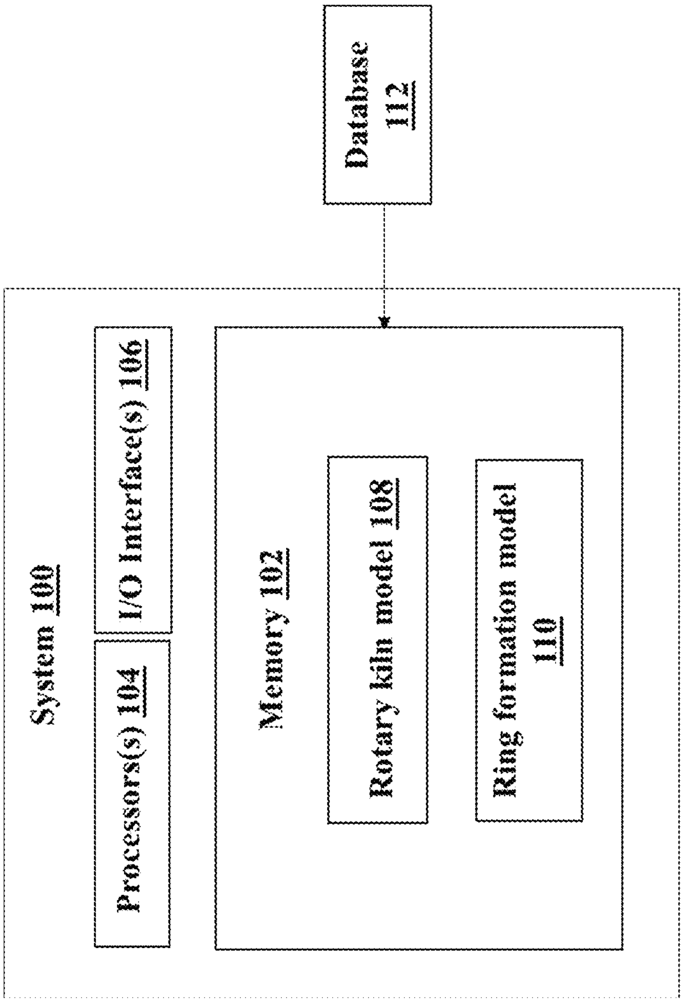
FIG. 1 is a functional block diagram of a system for predicting safe time of operation of a rotary kiln, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

Most existing techniques have technical limitations in predicting safe time of operation of the rotary kiln which is one of the most critical parameters in monitoring health of the kiln. Most existing techniques modelled aggregate formation and associated phenomenon in granulation drum using population balance modelling (PBM). Further existing methods modelled the granulation process by taking into consideration a coalescence kernel. Other methods disclosed a model that utilized population balance model with a coalescence kernel for modelling the aggregation in a rotating drum. All the above-mentioned proposed solutions were based on exploring the aggregation phenomenon as a function of temperature, physical interaction, moisture, and particle size.

The chemical reactions occurring inside the rotary kiln as a result of solid-solid interaction as well as solid-liquid interactions and their cumulative effect on mass balance, energy balance and kinetics of reaction are very critical for monitoring health of the rotary kiln. Also, temperature variation along the length of the kiln is critical for such solid-solid and solid-liquid interactions. It is necessary to construct a comprehensive mathematical model for predicting the complicated processes occurring in rotary kiln to realize the effect of aggregation and melting leading to the clinker formation and to explore the design and operational parameters.

Embodiments of the present disclosure provide a method and system for predicting safe time of operation for the rotary kiln by estimating ring size which is formed within the inner walls of the rotary kiln. The ring formation reduces the cross-section area available for solid-solid and solid-liquid interactions and has a negative impact on the operations of the rotary kiln. Therefore, it is essential to estimate ring size on suitable intervals over the period of time to predict safe time of the operation for the rotary kiln. The disclosed ring formation model is a dynamic model and is solved for the process in the time intervals to estimate the ring thickness, ring growth rate, and strength of the deposited material in the kiln to predict the safe process time to operate the plant without unsteady flow and blockage.

Referring now to the drawings, and more particularly to FIG. 1 through FIG. 6 where similar reference characters denote corresponding features consistently throughout the figures, there are shown preferred embodiments, and these embodiments are described in the context of the following exemplary system and/or method.

FIG. 1 is a functional block diagram of a system 100 for predicting safe time of operation of a rotary kiln, in accordance with some embodiments of the present disclosure. In an embodiment, the system 100 includes a processor(s) 104, communication interface device(s) 106, alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like. The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to number of external devices or to another server or devices. The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

In an embodiment, the memory 102 includes a plurality of models such as a rotary kiln model 108 and a ring formation model 110. The plurality of modules includes programs or coded instructions that supplement applications or functions performed by the system 100 for executing different steps involved in the prediction of safe time of operation of the rotary kiln, being performed by the system 100. The modules, amongst other things, can include routines, programs, objects, components, and data structures, which perform particular tasks or implement particular abstract data types. The modules 108 and 110 may also be used as signal processor(s), node machine(s), logic circuitries, and/or any other device or component that manipulates signals based on operational instructions. Further, the modules can be used by hardware, by computer-readable instructions executed by the one or more hardware processors 104, or by a combination thereof. The modules may include computer-readable instructions that supplement applications or functions performed by the system 100.

The modules include various sub-modules such as a solid bed height variation model, a solid stream model, a melt model, an aggregation model and a volatile model and a gas stream model. The sub-modules estimate plurality of parameters, the cumulative result of all the parameters estimates size of the ring formed within inner walls of the rotary kiln.

Figure 2:
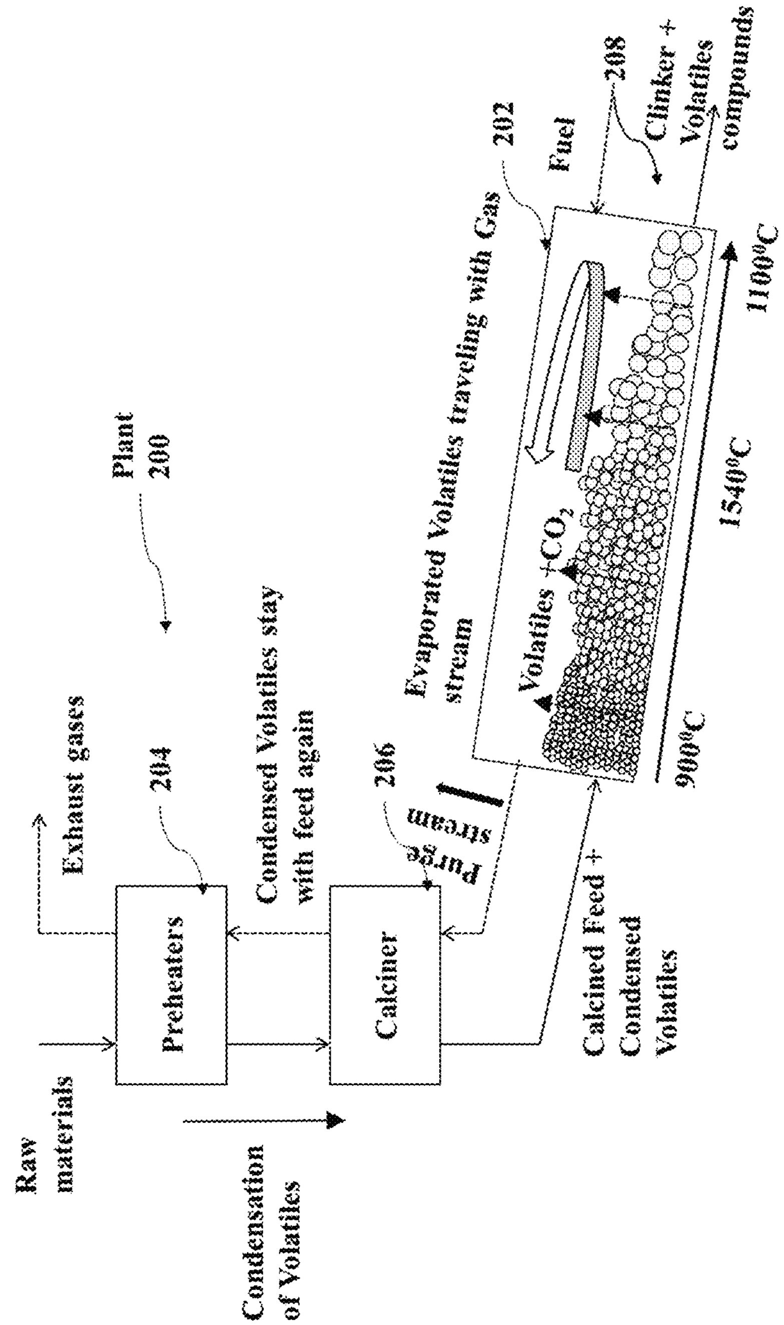
FIG. 2 is an illustrative diagram of a cement plant with the rotary kiln, according to some embodiments of the present disclosure.
Figure 3:
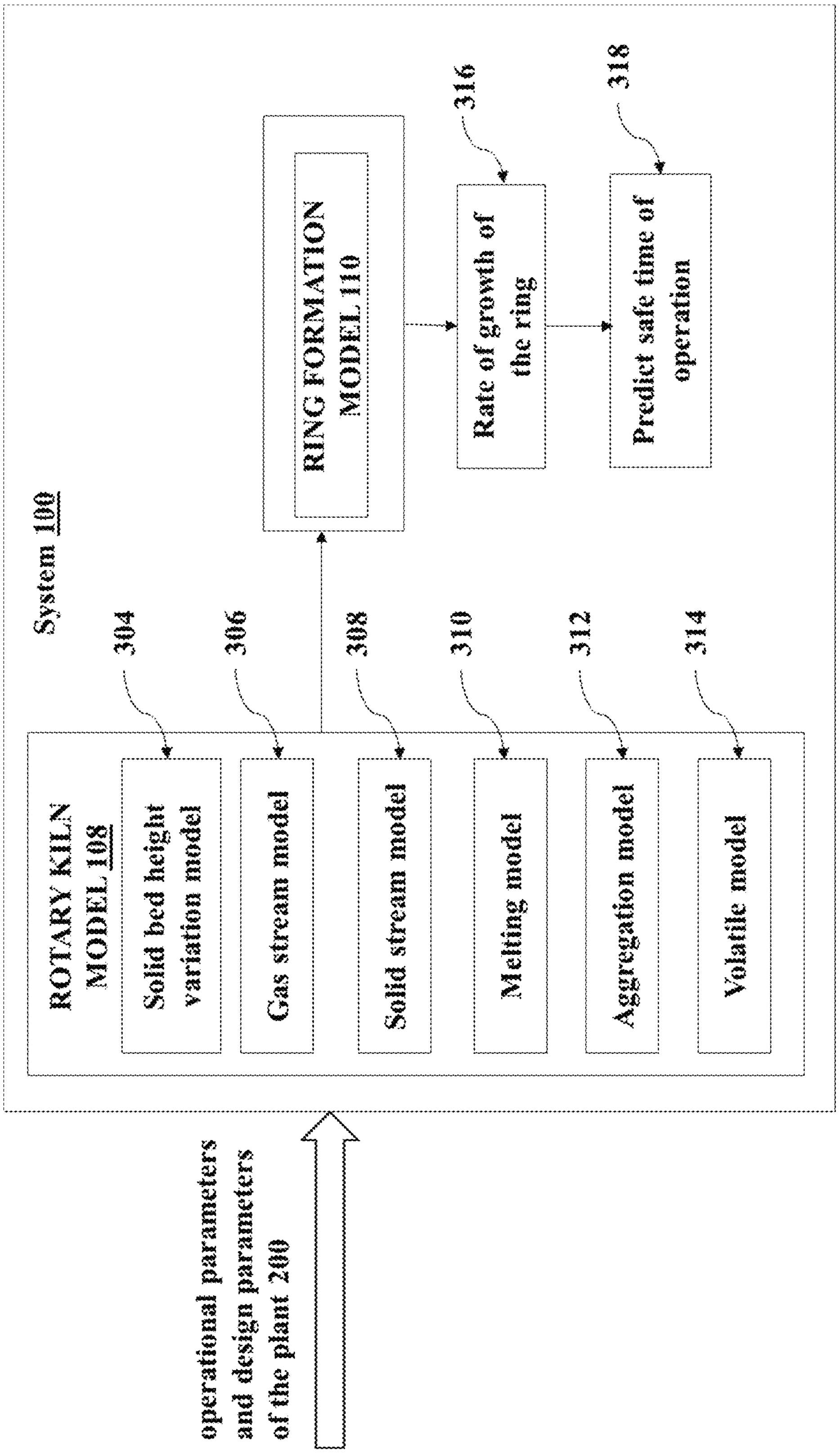
FIG. 3 illustrates association of plurality of modules predicting safe time of operation, according to some embodiments of the present disclosure.

The integrated architecture of the plurality of modules and sub-modules depicting the architectural overview of the system 100 is shown in FIG. 2 and explained in conjunction with a method flow diagram depicted in FIG. 3.

Further, the memory 102 may comprise information pertaining to input(s)/output(s) of each step performed by the processor(s) 104 of the system 100 and methods of the present disclosure. Further, the memory 102 includes a database 108. The database (or repository) 108 may include a plurality of abstracted piece of code for refinement and data that is processed, received, or generated as a result of the execution of the plurality of modules.

Although the database 112 is shown external to the system 100, it will be noted that, in alternate embodiments, the database 112 can also be implemented internal to the system 100. The external database is communicatively coupled to the system 100. The data contained within such an external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the architecture of the system 100 depicted in FIG. 2, method steps in flow diagrams in FIG. 3, functional arrangements of the rotary kiln in FIG. 4, and ring size formation depicted in FIG. 5.

FIG. 2 is an illustrative diagram of plant process of the rotary kiln, according to some embodiments of the present disclosure.

As illustrated in the FIG. 2, the rotary kiln arrangement in the plant 200 comprises of pre-heaters 204 that receive raw material. The raw material is heated in the preheater 204 and transferred to calciner 206. The calciner 206 has a higher temperature than pre-heaters 204. Volatiles condense in the preheaters as the temperature drops. The calcined feed along with condensed volatiles enters the rotary kiln 202. The feed enters from one end of the rotary kiln 202 and is referred to as a feed end. The other end of the rotary kiln facilitates discharge of clinker and is referred to as discharge end. The feed comprises of plurality of raw materials of different sizes and different chemical nature. The rotary kiln temperature is not uniform but varies along the length of the kiln. The temperature is comparatively lesser at the feed end and is higher at the discharge end. The rotary kiln is placed in a tilted position wherein the feed end is placed slightly higher than the discharge end to facilitate flow of material in the rotary kiln. As the feed moves along the length of the kiln, a plurality of phenomenon occurs together. The rotary kiln 202 is provided with a hot gas or fuel supply. The hot gas/fuel 208 enters from the discharge end of the kiln 202 and flows from the discharge end to the feed end. The gas stream thus produces counter current as it flows against the direction of movement of the feed. So within the lumen of the rotary kiln 202, there exists a cross-section area of the feed, cross-section area of the gas stream and the cross-section area where the feed and gas stream interact. As the feed enters the rotary kiln 202, it experiences high temperature. At this high temperature volatiles present within the feed starts to evaporate and goes to the gas stream. Some of the low melting solids change their state from solid to liquid. Solid particles of the feed adhere to form bigger particles that may be called aggregates. These aggregates end up to be much bigger in size as compared to the feed particles. At the end, clinker aggregates formed as a result of aggregation are discharged from the discharge end and the gas stream takes an exit from the feed end. A small part of the gas stream may be purged to control the volatile concentration in the process.

FIG. 3 illustrates association of plurality of modules predicting safe time of operation, according to some embodiments of the present disclosure.

As illustrated in the FIG. 3, plurality of models is associated to predict safe time of operation. The plurality of phenomenon occurring inside the rotary kiln due to plurality of chemical and physical interaction among the solid stream comprising solid feed, the low melting solids and the gas stream comprising volatiles and gas/fuel is studied by the plurality of mathematical models. Each model of the rotary kiln estimates certain parameter(s) and the cumulative result of all the models is utilized in predicting the safe time of operation of the rotary kiln. The rotary kiln models 108 considered for predicting safe time of operation are solid bed height variation model 304, gas stream model 306, solid stream model 308, melt model 310, aggregation model 312 and volatile model 314. The rotary kiln model is explained in terms of cement making process wherein raw materials are fed to the rotary kiln and a clinker is formed as a result of plurality of chemical and physical interactions within the rotary kiln. This process of clinkerization is presented as one-dimensional mathematical modeling. In the present invention, the one-dimensional mathematical model of a rotary kiln is developed, which includes the solid bed height variation model 304, gas stream model 306, solid stream model 308, melt model 310, aggregation model 312 and volatile model 314. These models consider the reaction kinetics, mass, and heat transfer, melt formation and growth kinetics of the clinker along the kiln length. Details of these models are explained below:

SOLID BED HEIGHT VARIATION MODEL: To simulate the heat and mass transfer in the kiln, the available area for the gas stream and solid feed (the solid phase) is required. The solid bed height variation model 304, captures the solid bed profile based on the solid flow rate, a kiln tilt angle, an angle of repose for solid material, a radius of the rotary kiln and a rotational speed of the kiln. These are the operation and design parameters which the solid bed height variation model 304 receives to estimate the height of the solid bed. This solid bed profile is used for the calculation of the cross-section area of the solid stream, gas stream section, and available interfacial heat transfer area in between solids, gases, and kiln walls. Kramer's model is formulated for the solid bed profile in this work, which is given by Kramers and Croockewit [1952] and is represented below as equation (Eq.) (1).

$$\frac{dh}{dx} = \tan\gamma\left[\frac{\tan\beta}{\tan\gamma} - \frac{3\phi_v}{4\pi nR^3}\left(\frac{2h}{R} - \frac{h^2}{R^2}\right)^{-3/2}\right] \tag{1}$$

GAS STREAM MODEL: The gas stream model 306 estimates the energy balance that is produced in the gas region by the burning of fuels, most common fuel is coal in the case of cement kilns while other fuels, such as gas, oil, liquid waste materials, solid waste materials, and petroleum coke, have all been effectively employed as sources of energy in the cement kiln and could be modelled using the current framework. Coal particles along with the secondary air enter the kiln from the discharge end. Combustion of coal in the gas region accounts for continuous devolatilization, finite rate gas phase combustion, methane combustion and carbon reaction in a one-dimensional kiln model. In this scenario, coal particles absorb energy from the gas through convection and radiation, causing coal particles to devolatilize. The rate constant (k) for each of these processes is calculated by Eq. 2 and phase concentration for gas stream components is tracked by using Eq 3. Mass and energy conservation simulated by Eq. 4 and 5 respectively. Where NR is total number of reactions, NC is total components, $Z_{ij}$, $Z_{j,base}$, are the $j^{th}$ reaction's stoichiometric coefficient for component i and for the base component respectively. $R_j$ represent the reaction rate of the $j^{th}$ reaction. $C_{ij}$, $C_{j,base}$, for $j^{th}$ reaction represents the ratio of molecular weight of component i and molecular weight of base component respectively, for coal devolatization reaction it represents mass fraction of component i and mass fraction of the coal respectively.

$$k = k_0 \times e^{\left(\frac{-E}{RT_g}\right)} \tag{2}$$

$$U_{gas}\frac{dy_i}{dz} = \sum_{i=1}^{NC}\left(\left(\sum_{j=1}^{NR}\frac{Z_{ij}}{Z_{j,base}} \times R_j\right)\frac{c_i}{c_{j,base}}\right) \tag{3}$$

$$\frac{dm_{Gas}}{dz} = \left(\sum_{i=1}^{NC}\frac{dy_k}{dz}\right) \times V_{gas} \tag{4}$$

$$\frac{d(A_g U_{gas}\rho_g Cp_g T_g)}{dx} = -Q_{gas-loss} - \left(\sum_{i=1}^{NC} R_i H_i\right) \times A_g + S_{CO_2} \tag{5}$$

where, $V_{gas}$, $m_{gas}$ represents the volume and mass flow rate of the gas. $A_g$, $U_{gas}$, $\rho_g$, $Cp_g$, $T_g$ represent area for gas flow, velocity, density, heat capacity and temperature of the gas respectively. In Eq. 5 term $Q_{gas-loss}$ indicate net heat loss from the gas, second term in the R.H.S. shows heat addition due to reaction, while the term $S_{CO2}$ represent the heat addition by the $CO_2$, generated from the calcination of $CaCO_3$.

THE SOLID STREAM MODEL: In the solid stream model 308, all the kinetic reactions, heat transfer equations for the heat transfer between the solids present in the feed, gases present in the gas stream, the kiln wall and the overall environment of the kiln, melting and aggregation phenomenon are considered. To estimate reaction kinetics from the solid stream model, reactions are considered based on Arrhenius-type rate expression and utilized for describing overall reaction rates.

To formulate the mass balance in the process, mass conservation equation for species is written with the help of Eq. 6 assuming a plug flow of all the solids present in the feed.

$$\frac{d(A_{cl} V_{cl}\rho_{cl} Y_i)}{dx} = R_i A_{cl} \tag{6}$$

Here Yi is the species mass fraction and Ri is the rate of reaction of an individual species that is calculated with the help of reaction rate expression defined in the Eq. 7. $A_{cl}$ is the cross-section area of the bed, $V_{cl}$ is the velocity of the solid bed, and $\rho_{cl}$ is the bulk density of the solids.

$$Ri = \sum_{i-1}^{NC}\left(\sum_{j=1}^{NR}\left(\frac{Z_{ij}}{Z_{j,base}}\right)Rij\right)\frac{M_i}{M_{j,base}} \tag{7}$$

In the above equation, NR is total number of reactions, NC is total components, $Z_{ij}$ is the stoichiometric coefficient for i component in $j^{th}$ reaction, $Z_j$, base is the stoichiometric coefficient for the base component for $j^{th}$ reaction, Rx represent the reaction rate expression for the particular reaction. The chemical reactions occurring in the solid bed region are driven by energy supplied by the gas stream region and kiln walls. Although heat transfer occurs by all three mechanisms: radiation, conduction and convection. Although, radiation is a dominant mode of heat transfer here. The energy conservation for solid bed region is given by Eq. 8:

$$\frac{d(A_{cl}V_{cl}C\rho_{cl}T_{cl})}{dx} = Q_{bed}L_{gcl} - \left(\sum_{i=1}^{NC} R_iH_i\right)A_{cl} - S_{CO_2} \quad (8)$$

In the above equation, the left-hand side (L.H.S.) represents the convective energy transfer. The first term on the right-hand side (R.H.S.) of Eq. 8 represents the heat received by the solid bed from the gas stream gas and the hot internal kiln walls. $Q_{bed}$ is the heat flux received by the bed from the gas stream and kiln walls, and $L_{gcl}$ is the chord length of solids exposed to the gas stream region. The second term in the R.H.S. of the above equation represents the energy required during chemical reactions (Hi is the heat of formation of species i). $SCO_2$ is the volumetric heat sink term due to $CO_2$ transfer from solid bed to gas stream region that is depended on the rate of formation for $CO_2$.

THE MELT MODEL: In the melt model 310, rate of formation of molten phase by calculating energy parameter associated with the total available solid material along the length of the kiln is estimated. As solid bed temperature in the kiln reaches above the melting point of some solid phases, these phases start melting as the solid bed temperature crosses the solidus temperature of the solid phase. Tracking the total fraction of the liquid phase in the solid stream is important as it acts as a binder facilitating particle aggregation. The molten phase accelerates the clinker formation in the kiln as it attracts the solid particles to stick to each other and forming bigger particles. The molten phase formation is given by the Eq. 9.

$$\frac{dL}{dt} = \frac{K_{corr}N_0\left(4\pi R_{mean}^2\right)K_l(T_b - T_s)}{\lambda Q_s} \quad (9)$$

In this equation, the numerator term represents the total energy received by the solid particles having a constant solidus temperature $T_s$. The solidus temperature is the temperature at which the first drop of the liquid will form during the heating of the solids. The denominator represents the total energy required for melting the available solid material. Here, $N_0$ represents the initial total number of solid particles, $R_{mean}$ is the mean solid particle size which is varying with length of kiln, $K_l$ is the solid bed thermal conductivity, lambda $Q_s$ is the latent heat of solid bed and, $T_b$ is considered the solid bed temperature at the particular kiln length.

THE AGGREGATION MODEL: The aggregation model 312, is a population balance model by Ranodolph et. al. [1988] for a continuous system with constant volume is given as follows:

$$\frac{\partial n}{\partial t} + \frac{\partial (Gn)}{\partial L} = B - D + \frac{1}{V}\left(\sum Q_{in}n_{in} - \sum Q_{out}n_{out}\right) \quad (10)$$

wherein, L is the characteristic length, such as diameter of the particle, n is the number-density function, G is the growth rate (rate of change of L), B is birth and D death rates of the particle, respectively. The last term in this equation shows the bulk flow in and out of the system. The birth and death terms may include nucleation, aggregation and breakage. In our study we have considered only aggregation, and its formulation is given in the study of Hounslow et al. [1988] The above equation is simplified by Hounslow et al. [1988] with certain assumptions as follows:

four binary interactions were taken.

particle size distribution is represented by idealized density function ($n=N_i/V_i$)

volume correction factor was taken equal to ⅔ for conservation of total volume of the particles in the aggregation.

The modified equation (as Eq. 11) for calculation the number of particles at time t is given by:

$$\frac{dN_i}{dt} = N_{i-1}\sum_{j=1}^{i-2} 2^{j-i+1}\beta_{i-1,j}N_j + \frac{1}{2}\beta_{i-1,i-1}N_j^2 - N_i\sum_{j=1}^{i-1} 2^{j-i}\beta_{i,j} - N_i\sum_{j=1}^{\infty}\beta_{i,j}N_j \quad (11)$$

where Ni is the number of particles in the size i and β is the coalescence kernel (growth rate) value. The first term on the right-hand side (R.H.S.) of the equation relates the aggregation in the $i^{th}$ size class when a particle in the $(i-1^{th})$ size class aggregate with a particle in the first to $(i-1^{th})$ size. The second term is used for agglomerates formed in the $i^{th}$ size by collisions between particles both in the $(i-1^{th})$ size. The third term in the R.H.S. relates to the decrease in the number of particles by aggregation when a particle in the $i^{th}$ size collides and adheres to a particle of sufficient size for the resultant aggregate to be larger than the upper size limit of the $i^{th}$ size. The last term in the R.H.S. relates to the decrease in the number of particles in the $i^{th}$ size if a particle in the $i^{th}$ size agglomerates with a particle from that or a higher size class.

$$\frac{dN_i'}{dt} = \frac{dN_i}{dt} \times \frac{1}{N_{Total}} \quad (12)$$

Eq. 11 further converted into fractional form by dividing the number of particles at a particular size with the total number of particles as given in the Eq. 12. $N'_i$ is particle fraction at particular size i, $N_{Total}$ is total number of particles in the system.

$$\frac{dN_i'}{dx} \frac{1}{Vcl} \times \frac{dN_i}{dt} \quad (13)$$

The above Eq. 12 is converted to length derivative from time derivative using the velocity of the overall mass of the particles inside the kiln (Eq. 13). To solve this model, a discretized size domain is considered, with volumes in a geometric series satisfying the condition Vi+1/Vi=2. The particle size distribution (PSD) considered as a discrete distribution, that means only particles of size v, 2v, 4v, etc. exists. The above-formulated equations allowed the interaction of particles at a particular rate and split the formed particles into the permissible sizes in a way, such that it conserves volume. For example, particles of size $V_1$ and $V_2$ interact to form a single particle of size $V_3$, where $V_2$ is $2V_1$ and $V_3$ is $2V_2(4V_1)$. The growth factor (coalescence kernel) is calculated based on the amount of melt produced during the process and calibrated using a constant value. The relation between these two quantity is given by Eq. 14

$$\beta_{i,j} = \text{melt fraction} \times k_g \quad (14)$$

wherein $k_g$ is a calibration factor. It is intuitive that the coalescence kernel between two size class i and j distinguish with a growth rate $\beta_{i,j}$, instead of single growth rate. In the Eq. 14 growth rate is taken in the form of a square matrix since growth rate is identical for size i with j as it is for size j with size i. The dimension of the matrix is equal to the number of interval taken. This matrix felicitates the growth rate factor assignment as is needed between two particles. For example, two large particle of 30 mm and 40 mm could not combined to give a particle size of 70 mm, hence their growth rate set to a smaller value.

THE VOLATILE MODEL: The volatile model 314 estimates the flow rate of volatile compounds circulating in the rotary kiln; and the deposition rate of the volatile compounds at the inner walls of the rotary kiln forming a ring; wherein the volatile compounds iteratively experience change in state parameters along the length of the rotary kiln causing deposition and re-circulation. The volatile model focuses on volatile components introduced in the rotary kiln with the feed and fuel. Major components among those are alkali, potassium, chloride, and sulfur. There are other heavy metals also in the feed and fuel streams but in less quantity. These volatile components form complex compounds by interacting with each other and clinker material around them. There are other heavy metals also in the feed and fuel streams but in less quantity. These volatile materials can cause operation problems in the system by circulating within the kiln and reaching higher concentrations. The quality of the clinker can also be compromised with high content of volatile compounds in the feed and these materials take part in the inlet ring formation in the kiln and build-ups in the pre-heater cyclones that causes the unsteady material flow and frequent blockage of the cyclone. Tracking the concentration of the volatile compounds in the kiln is a necessary step in the cement process, a mathematical model is needed to study the circulation of these compounds in the system and the remaining concentration in the kiln system after taking part in the ring formation and discharge with the clinker. To simulate the volatile study in the cement rotary for continuous production, several parameters were calculated. Firstly, volatile flow rate ($F_v$) inside the rotary kiln with feed is determined. Then, net deposition rate ($R_v$) due to volatile compounds at the inner surface of the initial part of the kiln and circulation rate ($K_v$), the amount of the volatile compounds that are evaporating with the increasing temperature of the solid material and traveling back with the gas stream in the kiln are determined. And volatile compounds having higher melting temperatures, come out with the solid clinker as a solid phase ($C_v$) are factored. The overall mass balance for the volatiles is explained by the below Eq. 15 in each iteration.

$$F_V\alpha(Q_s) \tag{15}$$

$$K_v\alpha(Rxn\text{ kinetics\_lowBP volatiles}, T_s, T_g)$$

$$C_v\alpha(Rxn\text{ kinetics\_highBP volatiles}, T_s, T_g)$$

$$F_v = K_v + R_v + C_v$$

Here in Eq. 15, $F_v$ depends on the feed composition and that net volatiles in raw feed and recirculated volatiles after purging some of them. There are volatile compounds such as KCl and NaCl that have a low boiling point and they get evaporated in the cement rotary kiln with increasing solid bed temperature (Ts). The kinetics of such compounds along with Ts and Tg temperature are the parameters to calculate the circulation rate, $K_v$ inside the rotary kiln. Similarly, high boiling points compounds such as $K_2SO_4$ and $CaSO_4$ come out with the clinker as a solid phase. The Net deposition rate of the volatile compound, $R_v$ is calculated based on the low melting point of volatile compounds as they get melted at lower temperatures and start sticking to the wall of the initial length of the rotary kiln and this rate is used in the ring formation model as an input model parameter. Total volatiles concentration can be calculated at any time in the cement process and clinker quality can be controlled by changing the feed composition or purging the excess volatiles from the system. This model can be used to watch the volatiles in the rotary kiln.

In an embodiment, the volatile model can be used for any sort of volatile element in the process based on the reaction kinetics and phase thermodynamic data. Different alternative fuels have different volatiles with the fuel stream in the rotary kiln and that information does not change the current solution approach. Alternative fuels can be both solid and liquid and the most widely used are shredded tires, meat and bone meal, and solid recovered fuel in the industries. In case, alternative fuels have a larger particle size, higher volatile and moisture contents, and a lower heating value compared to fossil fuels. This makes their use in the kilns challenging and complete information is needed to use them in the rotary kiln.

THE RING FORMATION MODEL: The ring formation model 316, aggregates all the parameters derived from above-described models to predict safe time of operation of the rotary kiln. In the cement rotary kiln, the deposition at the inside surface starts with the liquefying of some solid materials and sticking to the wall. The minimum coating layer acts as a protective layer for the refractory in the hot temperature zones. As the process continues these coating layers at different locations start building more as more solid materials melt in the process and they start forming ring types of structures in the kiln. Coating and formed rings are influenced by composition of the clinker solids at the location, dust particles, ash, and volatile compounds that adhere to the wall of the kiln, and they changed from melted material to solid material at the wall. Ring formation depends on the amount of kiln feed that liquefies at the clinkering temperatures. A kiln feed that has more liquid at the clinkering temperatures is more sensitive to the ring formation in the process. So, ring formation in the cement process is a vital process as it depends on the operating conditions that include the feed composition, temperature inside the kiln, volatiles in the feed and fuel, fuel quality etc. The heating of the solid material is responsible for the formed liquid in the kiln and this molten liquid is the initial step towards the initial coating to form on the surface of the refractory. Different temperature zones are observed in the kiln due to the counter-current coal feeding and clinker reactions. According to the different temperature zones in the kiln, different thickness of the rings has been observed in the operating rotary kiln after the shutdown process in the industry. Several types of rings are observed in the rotary including the ring due to volatile compounds at the initial rotary from the feed end, clinker rings, and ash ring towards the discharge end. The disclosed ring formation model 110 is a dynamic model and other models described above are steady-state models. The ring formation model is solved for the process in the time intervals to estimate the ring thickness, ring growth rate, and strength of the deposited material in the kiln to predict the safe process time to operate the plant without unsteady flow and blockage.

The Rate of growth of the ring 316, has dependency of the parameters on the growth rate and removal rate of the ring formation and is defined with the help of the below equations 16 to 18:

$$dG(+)/dt\alpha(\text{Molten phase, fine particles conc, solid bed size, clinker phases, } Ts,\ Rv) \tag{16}$$

$$(dG(-))/dt.(\text{Coarse particle conc, solid material size, } Ts) \tag{17}$$

$$dGn/dt=\left[dG(+)/dt+dG(-)/dt\right] \tag{18}$$

The (dG(+))/dt is the growth rate of the ring formation and (dG(−))/dt explains the removal of the deposition from the formed ring that contributes to a decrease in thickness. (dG(+))/dt term depends on the melt part in the system as melt creates the sticky surface at the walls to develop the fine particle growth at the surface and the amount of formed melt depends on the solid material temperature ($T_s$). Parallelly, (dG(−))/dt is proportional to the coarse particle concentration as the coarse particle supports the removal mechanism from the sticky surface at the inner walls. The sum of these two terms stands for the net growth rate for the ring formation and this rate is the function of the time along the kiln length.

Along the kiln length, the net growth will have different values as the clinker phase concentration, solid material temperature, and other parameters are simulated with the kiln length. The strength of the coating depends on the molten quantity (ML) and temperature of the phases and their thermodynamic property at that temperature. This parameter is also estimated with the help of the ring formation and can be used to check the strength of the deposition with the process time and damage of the refractory wall can be monitored with this parameter.

Therefore, the safe process time 318 is predicted based on the rate of growth of the ring. The ring formation model is utilized to monitor the safe process time by solving the rotary kiln model to provide the coating thickness, growth rate, and strength of the coating to the rotary kiln model. From that point, the correct decision can be made based on all this information. To solve the ring formation model, parameters from the rotary kiln model are first simulated such as internal temperatures, clinker phase concentrations, melted fraction, outer shell temperature and size of the solid material. With the help of the internal temperatures and outer shell temperature, the overall heat transfer term is computed along with the effective conductivity of the wall assuming an overall composite wall. This composite wall includes the refractory wall, coating wall with thickness, and outer shell. And this effective conductivity plays an important role in calculating the thickness of the deposited build-up in the form of rings at the inner wall and the same information is transferred to the ring formation model for the model tunning. After this step, the calculated ring formation rate is used to estimate the build-up rate (dGn/dt) and time to reach the ultimate coating to block the flow inside the rotary kiln.

Figure 4A:
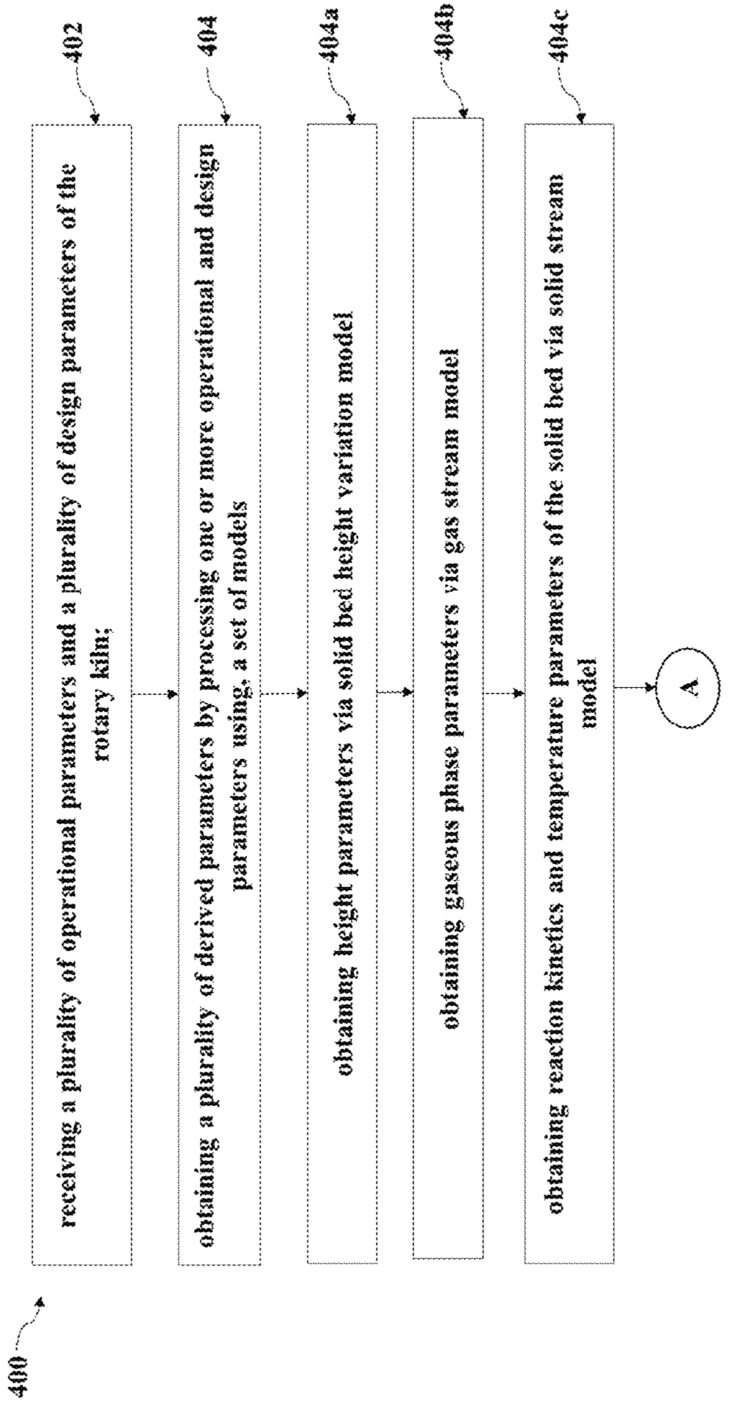
FIGS. 4A and 4B are an exemplary flow diagrams for a method of predicting safe time of operation for the rotary kiln, according to some embodiments of the present disclosure.
Figure 4B:
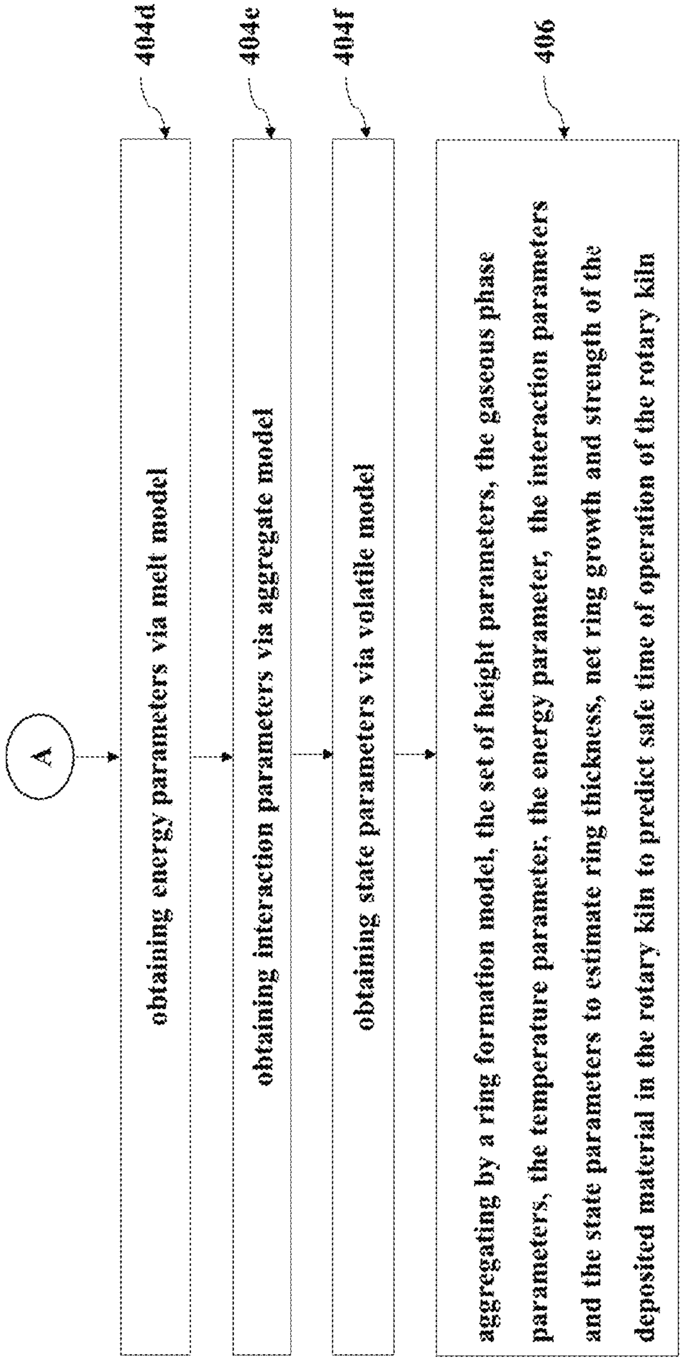

FIGS. 4A and 4B are an exemplary flow diagrams for a method of predicting safe time of operation for the rotary kiln, according to some embodiments of the present disclosure.

In an embodiment, the system 100 comprises one or more data storage devices or the memory 102 operatively coupled to the processor(s) 104 and is configured to store instructions for execution of steps of the method 400 by the processor(s)

or one or more hardware processors 104. The steps of the method 400 of the present disclosure will now be explained with reference to the components or blocks of the system 100 as depicted in FIG. 1 through FIG. 6. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 402 of the method 400, the one or more hardware processors 104 are configured to receive a plurality of operational parameters and a plurality of design parameters of the rotary kiln 202. The plurality of design parameters comprises of kiln tilt angle, angle of repose for solid material, the radius of the rotary kiln and rotational speed of the kiln and wherein operational parameters comprises of solid feed rate, solid flow rate, temperature of kiln at the feed end, discharge end, at the middle, within the lumen of the kiln 202 and near the walls of the rotary kiln 202. At step 404 of the method 400, the one or more hardware processors 104 are configured to obtain a plurality of derived parameters by processing one or more operational and design parameters using, a set of models, the set of models comprises the solid bed height variation model, the solid stream model, the gas stream model, the melt model, the aggregation model, and the volatile model. At step 404*a* of the method 400, the one or more hardware processors 104 are configured to obtain height parameters via solid bed height variation model. The solid bed height variation model estimates the height of the solid bed by assuming a certain bed height at the discharge end as an initial condition and subsequently calculating the solid bed height parameters along the length that varies from the discharge end to the feed end. The solid bed height parameters predict cross-section area of the solid stream, gas stream and available interfacial heat transfer area in between solids, gases and kiln walls. At step 404*b* of the method 400, the one or more hardware processors 104 are configured to obtain gaseous phase parameters via gas stream model. The gas stream model estimates a gaseous phase parameters associated with a plurality of gaseous components of the gas stream introduced through the discharge end of the rotary kiln. The gas stream model calculates reaction kinetics of the plurality of gaseous components of the gas stream to obtain overall heat balance, wherein a part of gaseous components is introduced through a fuel injected from the discharge end and a part of gaseous components are obtained through the reactions of the solid bed triggered by high kiln temperature. At step 404*c* of the method 400, the one or more hardware processors 104 are configured to obtain reaction kinetics and temperature parameters of the solid bed via solid stream model. The solid stream model simultaneously estimates the reaction kinetics of the solid bed associated with a plurality of components formed in the rotary kiln 202 as a result of plurality of reactions occurring within various components of the solid bed and a molten phase formed within the rotary kiln 202, and also it estimates temperature parameters of the solid bed and the kiln walls by aggregating the obtained reaction kinetics and overall heat balance in the rotary kiln 202. At step 404*d* of the method 400, the one or more hardware processors 104 are configured to obtain energy parameters via melt model. The melt model estimates rate of formation of molten phase by calculating energy parameter associated with the total available solid material along the length of the kiln. The melt model estimates the rate of formation of the molten phase as the solid feed travels towards discharge end. Once the molten phase start forming in the kiln, the aggregation of the solid particles starts and that grow along the kiln. At step 404*e* of the method 400, the one or more hardware processors 104 are configured to obtain interaction parameters via aggregate model. The aggregate model calculates the rate of interaction among particles of the solid bed and molten phase forming an aggregate by obtaining interaction parameters. The aggregation model estimates the rate of interaction among particles by approximating particle size distribution using a general population balance model of a continuous system with constant volume, discretize in volume domain and the coalescence kernel is utilized in making such approximation. At step 404*f* of the method 400, the one or more hardware processors 104 are configured to obtain state parameters via volatile model. The volatile model estimates the flow rate of volatile compounds circulating in the rotary kiln 202; and the deposition rate of the volatile compounds at the inner walls of the rotary kiln 202 forming a ring. The volatile compounds iteratively experience change in state parameters along the length of the rotary kiln 202 causing deposition and re-circulation. The volatile model focuses on a minor and a major components introduced in the rotary kiln. The minor components are introduced in the rotary kiln 202 with feed and fuel. Major components among those are alkali, potassium, chloride, and sulfur. There are other heavy metals also in the feed and fuel streams but in less quantity. These volatile materials can cause operation problems in the system by circulating within the kiln and reaching higher concentrations. The quality of the clinker also can be compromised with high content of volatile compounds in the feed and these materials take part in the inlet ring formation in the kiln and build-ups in the preheater cyclones that causes the unsteady material flow and frequent blockage of the cyclone. Therefore, the state parameters estimated by the volatile model is utilized in predicting safe time of operation for the rotary kiln. The net flow rate of the volatile compounds inside the rotary kiln is calculated by adding (i) net deposition rate of volatile compounds at the inner walls of the rotary kiln, (ii) circulation rate of low melting volatile compounds evaporating with the increasing temperature of the solid bed along the length of the kiln and re-circulating with gas stream in the kiln, and (iii) the high boiling volatile compounds remained trapped in the solid bed. At step 406 of the method 400, the one or more hardware processors 104 are configured to predict safe time of operation for the rotary kiln by aggregating by a ring formation model, the set of height parameters, the gaseous phase parameters, the temperature parameter, the energy parameter, the interaction parameters and the state parameters to estimate ring thickness, net ring growth and strength of the deposited material in the rotary kiln to predict safe time of operation of the rotary kiln. The ring formation model is a dynamic model and is solved for the process in the time intervals to estimate the ring thickness, ring growth rate, and strength of the deposited material in the kiln to predict the safe process time to operate the plant without unsteady flow and blockage. To solve the ring formation model, parameters from the rotary kiln model are first simulated such as internal temperatures, clinker phase concentrations, melted fraction, outer shell temperature and size of the solid material. With the help of the internal temperatures and outer shell temperature, the overall heat transfer term is computed along with the effective conductivity of the wall assuming an overall composite wall. This composite wall includes the refractory wall, coating wall with thickness, and outer shell. And this effective conductivity plays an important role in calculating the thickness of the deposited build-up in the form of rings at the inner wall and the same information is transferred to the ring formation model for the model tunning. After this step, the calculated ring formation rate is used to estimate the build-up rate (dGn/dt) and time to reach the ultimate coating to block the flow inside the rotary kiln.

Figure 5:
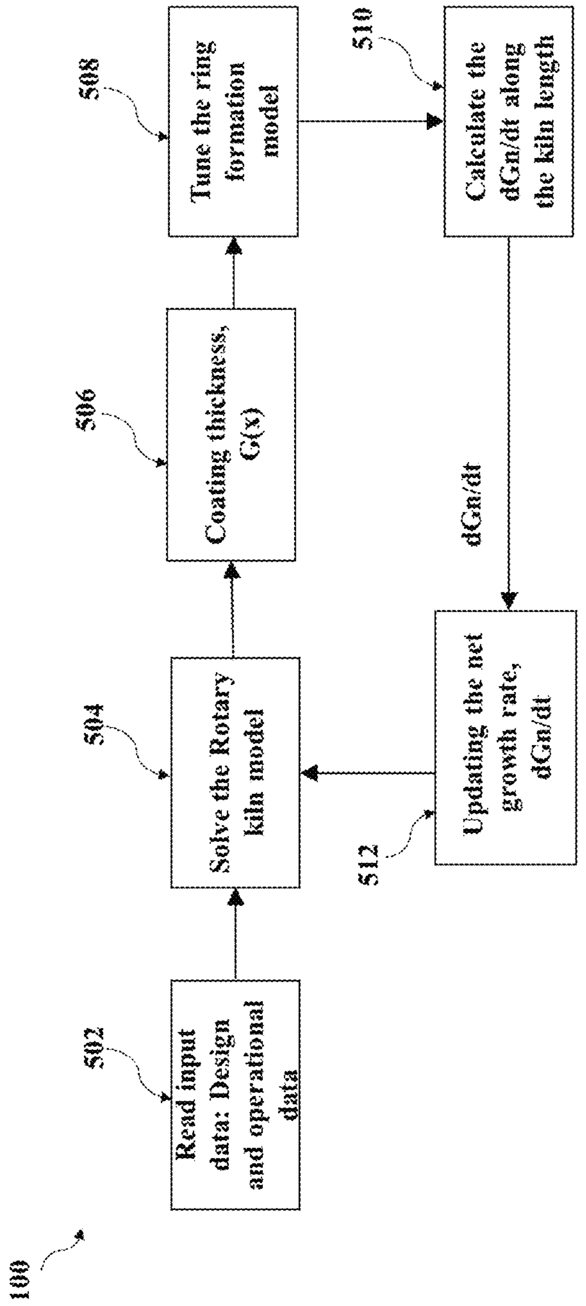
FIG. 5 illustrates a solution approach utilizing a rotary kiln model and a ring formation model, according to some embodiments of the present disclosure.

FIG. 5 illustrates a solution approach utilizing a rotary kiln model and a ring formation model, according to some embodiments of the present disclosure. As illustrated in FIG. 5, the association of ring formation model and rotary kiln model is described. The approach is to solve the solve the ring formation model by utilizing plurality of parameters obtained from the rotary kiln model. The rotary kiln model with all the sub-models is solved assuming a steady state process except the ring formation model. All sub-models in the rotary kiln model exchange the data to reach the steady-state solution. The deposition/build-up process inside the rotary kiln is a slow process and it always depends on feed composition, fuel quality, inside temperatures, and operational parameters. As illustrated in FIG. 5, in the first step the system 100 reads the data 502 for the rotary kiln which includes the feed and fuel information and all the design parameters. In the second step, the rotary kiln model 504 is solved by solving all the sub-models described above (the solid bed height variation model, the melt model, the aggregation model, and the volatile model). As a cumulative results of all the models of the rotary kiln model estimates volatile compounds profile, circulation rate, deposition rate, and their discharge rate with the clinker. With the help of these rates, total volatiles in the kiln can be tracked for the particular feed and fuel in the process. The volatile deposition rate is the interaction parameter along with the inertial temperature profile, phase data, and outer shell temperature for the ring formation sub-model. Then, deposited build-up thickness (G(x)) 506 is calculated based on the heat transfer from inside to outside as the heat transfer term depends on the thickness. The G(x) is a tuning parameter to estimate the net deposition rate. The ring formation model is further tuned to perform thickness computation 508. Further, tuned ring formation model 508 estimates dGn/dt function 510. Also, the processing time is estimated to avoid sudden blockage and damage inside the rotary kiln by comparing the coating thickness with the critical coating measurement. dGn/dt function then provide the net deposition rate 512 along the kiln length as other parameters vary with the kiln length and these parameters have an impact on the deposition rate. The system 100, updates the net growth rate, dGn/dt 512, whenever the model is made to predict the safe time of operation of the rotary kiln.

Figure 6:
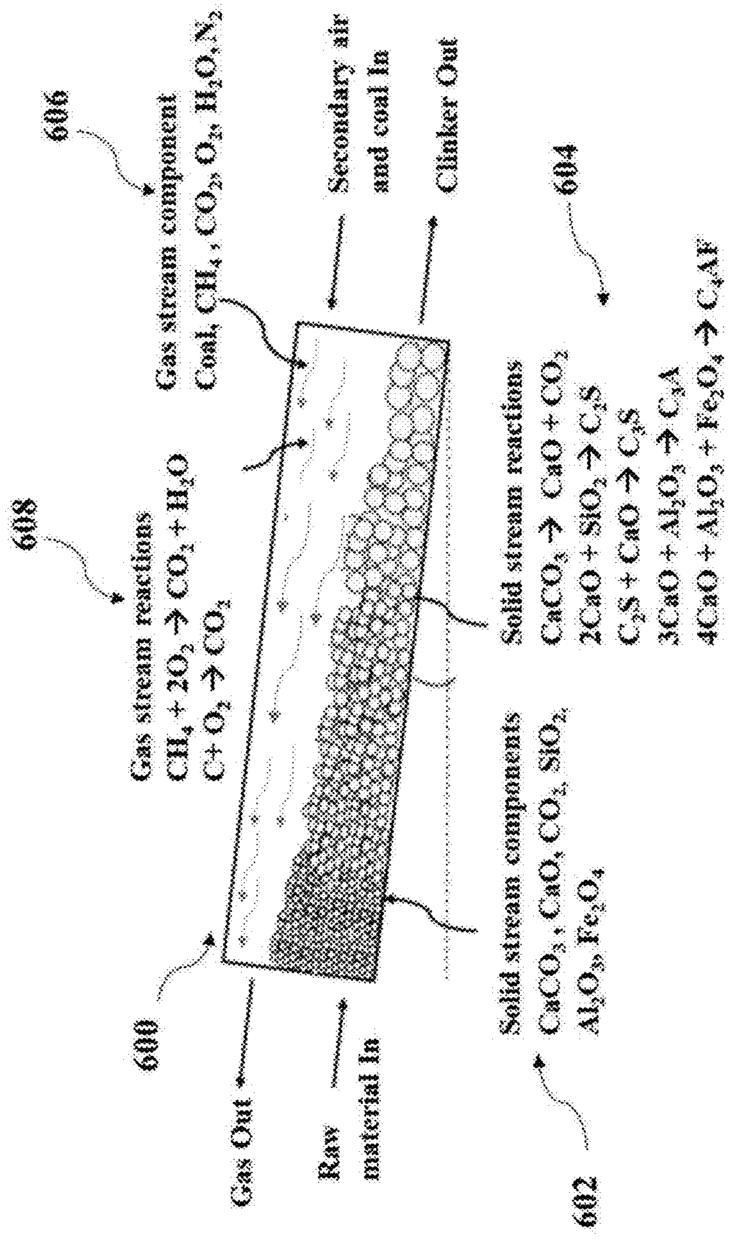
FIG. 6 illustrates chemical interactions occurring between solid feed, molten phase, gas stream and volatiles within the rotary kiln.

FIG. 6 illustrates chemical interactions occurring between solid feed, molten phase, gas stream and volatiles within the rotary kiln, according to some embodiments of the present disclosure.

As illustrated in FIG. 6, the rotary kiln 600, the solid feed flows from the feed end to the discharge end and the gas stream flows in an opposite direction, i.e. from discharge end to the feed end generating counter current within the kiln environment that accelerates the overall chemical interactions occurring inside the kiln. The rotary kiln 600 experience a plethora of chemical interactions within the solid bed due to interaction of various raw materials of the solid feed. The low melting compounds of solid feed also undergo phase change as a result of high kiln temperature and interact with other compounds of the solid bed. The volatile trapped within the solid bed evaporates and escapes to the gas stream and exhibits interactions with other gas stream components.

The gas stream comprises of fuel introduced to the kiln or fuel is burnt outside and the hot gas is introduced to the kiln which suffice high temperature requirement of the kiln. The solid stream, components 602 present in rotary kiln for cement clinkerization is composed of chemicals such as calcium carbonate ($CaCO_3$), calcium dioxide ($CaO$), carbon dioxide ($CO_2$), silicon dioxide ($SiO_2$), Aluminum oxide ($Al_2O_3$) and ferrous oxide ($Fe_2O_4$). The solid stream reactions 604, involves plurality of reactions such as decomposition reaction, addition reaction, combustion reactions and displacement reactions forming new compounds. Similarly, the gas stream components 606 comprises of coal, methane, carbon dioxide, oxygen, water vapor and nitrogen. These gas stream components experience gas stream reactions 608.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the present disclosure or if they include equivalent elements with insubstantial differences from the literal language of the embodiments described herein.

Therefore, a mathematical model for predicting safe time of operation for the rotary kiln is disclosed that factors chemical interactions within the rotary kiln and heat transfer to estimate ring formation. The model considers the temperature, mass concentrations of the clinker phases, growth of the solids, deposition, or build-up at inner walls from the inside of the rotary kiln due to high-temperature zones to estimate all these events together and provide solutions to estimate the safe operational time to avoid the blockage and unsteady flow inside the kiln. The disclosed solution approach for the one-dimensional mathematical model is developed to analyze and monitor the advanced phenomena inside the cement rotary kiln, which include volatile circulation, ring formation, and solid particle size growth along the rotary kiln length. The disclosed system and method efficiently monitor all phenomenon occurring inside the rotary kiln to prevent unplanned shut down due to blockage and unsteady process flow.

The embodiments of present disclosure herein address unresolved problem of preventing untimely/sudden shut down of the rotary kiln operations.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of monitoring performance of a rotary kiln by predicting safe time of operation, the method comprising:

receiving, via one or more hardware processors, a plurality of operational parameters and a plurality of design parameters of the rotary kiln, obtaining, via the one or more hardware processors, a plurality of derived parameters by processing one or more operational and design parameters using, a set of models executed by the one or more hardware processors, the set of models comprising a solid bed height variation model to estimate a height parameters of the solid bed along the kiln length, a gas stream model to estimate a gaseous phase parameters associated with a plurality of gaseous components in the gas stream introduced through the discharge end of the rotary kiln, a solid stream model to simultaneously estimate (i) reaction kinetics of the solid bed associated with a plurality of components formed in the rotary kiln as a result of plurality of reactions occurring within various components of the solid bed and a molten phase formed within the rotary kiln, and (ii) temperature parameters of the solid bed and the kiln walls by aggregating the obtained reaction kinetics and heat balance in the rotary kiln, a melt model to estimate rate of formation of molten phase by calculating energy parameter associated with the total available solid material along the length of the kiln, an aggregation model to calculate rate of interaction among particles of the solid bed and molten phase forming an aggregate by obtaining interaction parameters, and a volatile model by simultaneously estimating the flow rate of volatile compounds circulating in the rotary kiln; and the deposition rate of the volatile compounds at the inner walls of the rotary kiln forming a ring, wherein the volatile compounds iteratively experience change in state parameters along the length of the rotary kiln causing deposition and re-circulation; and aggregating, via the one or more hardware processors, by a ring model executed by the one or more hardware processors, the set of height parameters, the gaseous phase parameters, the temperature parameter, the energy parameter, the interaction parameters, and the state parameters to estimate ring thickness, net ring growth and strength of the deposited material in the rotary kiln to predict safe time of operation of the rotary kiln.

2. The method of claim 1, wherein plurality of design parameters comprises of kiln tilt angle, angle of repose for solid material, the radius of the rotary kiln and rotational speed of the kiln and wherein operational parameters comprises of solid feed rate, solid particle size distribution, solid chemical composition, temperature of kiln at the feed end, discharge end, at the middle, within the lumen of the kiln and near the walls of the rotary kiln.

3. The method of claim 1, wherein the solid bed height variation model estimates the height of the solid bed by assuming a certain bed height at the discharge end as an initial condition and subsequently calculating the solid bed height parameters along the length that varies from the discharge end to the feed end, and wherein the solid bed height parameters predicts cross-section area of the solid stream, gas stream and available interfacial heat transfer area in between solids, gases and kiln walls.

4. The method of claim 1, wherein the gas stream model calculates reaction kinetics of the plurality of gaseous components of the gas stream to obtain overall heat balance, wherein a part of gaseous components is introduced through a fuel injected from the discharge end and a part of gaseous components are obtained through the reactions of the solid bed triggered by high kiln temperature.

5. The method of claim 1, wherein the melt model estimates the rate of formation of the molten phase as the solid feed travels towards discharge end wherein a rate of molten phase formation is calculated by:

$$\frac{dL}{dt} = \frac{K_{corr} N_0 \left(4\pi R_{mean}^2\right) K_l (T_b - T_s)}{\lambda Q_s}$$

and wherein, numerator term represents the total energy received by the solid bed having solidus temperature and the denominator represents the total energy required by the total available solid material in the kiln along the length.

6. The method of claim 1, wherein the aggregation model estimates the particle size distribution of a continuous system preserving the solid volume utilizing a coalescence kernel given by:

coalescence kernel ($\beta_{i,j}$)=amount of melt fraction$\times k_g$ wherein, $k_g$ is the calibration factor.

7. The method of claim 1, wherein the gaseous component of the gas stream is a fuel introduced to the rotary kiln from the discharge end or is a gas mixture introduced to the kiln or the volatile compounds and other gaseous components present in the solid bed and released in the temperature triggered solid bed reaction or a mixture of above three, and wherein, the net flow rate of the volatile compounds inside the rotary kiln is calculated by adding (i) net deposition rate of volatile compounds at the inner walls of the rotary kiln, (ii) circulation rate of low melting volatile compounds evaporating with the increasing temperature of the solid bed along the length of the kiln and re-circulating with gas stream in the kiln, and (iii) the high boiling volatile compounds remained trapped in the solid bed and exiting along with the discharged product, and wherein the solid bed height variation model, the solid stream model, the melt model, the aggregation model and the volatile model perform estimations along the length of the rotary kiln, from the feed end towards the discharge end, and the gas stream model perform estimations along the length of the rotary kiln, from the discharge end towards the feed end.

8. A system, comprising:

a memory storing instructions;

one or more communication interfaces; and one or more hardware processors coupled to the memory via the one or more communication interfaces, wherein the one or more hardware processors are configured by the instructions to:

receive a plurality of operational parameters and a plurality of design parameters of the rotary kiln;

obtain a plurality of derived parameters by processing one or more operational and design parameters using, a set of models, the set of models executed by the one or more hardware processors comprising a solid bed height variation model to estimate a height parameters of the solid bed along the kiln length, a gas stream model to estimate a gaseous phase parameters associated with a plurality of gaseous components in the gas stream introduced through the discharge end of the rotary kiln, a solid stream model to simultaneously estimate (i) reaction kinetics of the solid bed associated with a plurality of components formed in the rotary kiln as a result of plurality of reactions occurring within various components of the solid bed and a molten phase formed within the rotary kiln, and (ii) temperature parameters of the solid bed and the kiln walls by aggregating the obtained reaction kinetics and heat balance in the rotary kiln, a melt model to estimate rate of formation of molten phase by calculating energy parameter associated with the total available solid material along the length of the kiln, an aggregation model to calculate rate of interaction among particles of the solid bed and molten phase forming an aggregate by obtaining interaction parameters, a volatile model to simultaneously estimate, the flow rate of volatile compounds circulating in the rotary kiln, and the deposition rate of the volatile compounds at the inner walls of the rotary kiln forming a ring, wherein the volatile compounds iteratively experience change in state parameters along the length of the rotary kiln causing deposition and re-circulation; and aggregate by a ring model the set of height parameters, the gaseous phase parameters, the temperature parameter, the energy parameter, the interaction parameters and the state parameters to estimate ring thickness, net ring growth and strength of the deposited material in the rotary kiln to predict safe time of operation of the rotary kiln.

9. The system of claim 8, wherein plurality of design parameters comprises of kiln tilt angle, angle of repose for solid material, the radius of the rotary kiln and rotational speed of the kiln and wherein operational parameters comprises of solid feed rate, solid particle size distribution, solid chemical composition, temperature of kiln at the feed end, discharge end, at the middle, within the lumen of the kiln and near the walls of the rotary kiln.

10. The system of claim 8, wherein the solid bed height variation model estimates the height of the solid bed by assuming a certain bed height at the discharge end as an initial condition and subsequently calculating the solid bed height parameters along the length that varies from the discharge end to the feed end, and wherein the solid bed height parameters predicts cross-section area of the solid stream, gas stream and available interfacial heat transfer area in between solids, gases and kiln walls.

11. The system of claim 8, wherein the gas stream model calculates reaction kinetics of the plurality of gaseous components of the gas stream to obtain overall heat balance, wherein a part of gaseous components is introduced through a fuel injected from the discharge end and a part of gaseous components are obtained through the reactions of the solid bed triggered by high kiln temperature.

12. The system as claimed in claim 8, wherein the melt model estimates the rate of formation of the molten phase as the solid feed travels towards discharge end wherein a rate of molten phase formation is calculated by:

$$\frac{dL}{dt} = \frac{K_{corr} N_0 \left(4\pi R_{mean}^2\right) K_l (T_b - T_s)}{\lambda Q_s}$$

and wherein, numerator term represents the total energy received by the solid bed having solidus temperature and the denominator represents the total energy required by the total available solid material in the kiln along the length.

13. The system as claimed in claim 8, wherein the aggregation model estimates the particle size distribution of a continuous system preserving the solid volume utilizing a coalescence kernel given by:

coalescence kernel ($\beta_{i,j}$)=amount of melt fraction$\times k_g$ wherein, $k_g$ is the calibration factor.

14. The system as claimed in claim 8, wherein the gaseous component of the gas stream is a fuel introduced to the rotary kiln from the discharge end or is a gas mixture introduced to the kiln or the volatile compounds and other gaseous components present in the solid bed and released by temperature triggered solid bed reaction or a mixture of above three, and wherein the net flow rate of the volatile compounds inside the rotary kiln is calculated by adding (i) net deposition rate of volatile compounds at the inner walls of the rotary kiln, (ii) circulation rate of low melting volatile compounds evaporating with the increasing temperature of the solid bed along the length of the kiln and re-circulating with gas stream in the kiln, and (iii) the high boiling volatile compounds remained trapped in the solid bed and exiting along with the discharged product, and wherein the solid bed height variation model, the solid stream model, the melt model, the aggregation model and the volatile model perform estimations along the length of the rotary kiln, from the feed end towards the discharge end; and the gas stream model perform estimations along the length of the rotary kiln, from the discharge end towards the feed end.

15. One or more non-transitory machine-readable information storage mediums comprising one or more instructions which when executed by one or more hardware processors cause:

receiving a plurality of operational parameters and a plurality of design parameters of the rotary kiln, obtaining a plurality of derived parameters by processing one or more operational and design parameters using, a set of models executed by the one or more hardware processors, the set of models comprising a solid bed height variation model to estimate a height parameters of the solid bed along the kiln length, a gas stream model to estimate a gaseous phase parameters associated with a plurality of gaseous components in the gas stream introduced through the discharge end of the rotary kiln, a solid stream model to simultaneously estimate (i) reaction kinetics of the solid bed associated with a plurality of components formed in the rotary kiln as a result of plurality of reactions occurring within various components of the solid bed and a molten phase formed within the rotary kiln, and (ii) temperature parameters of the solid bed and the kiln walls by aggregating the obtained reaction kinetics and heat balance in the rotary kiln, a melt model to estimate rate of formation of molten phase by calculating energy parameter associated with the total available solid material along the length of the kiln, an aggregation model to calculate rate of interaction among particles of the solid bed and molten phase forming an aggregate by obtaining interaction parameters, and a volatile model by simultaneously estimating the flow rate of volatile compounds circulating in the rotary kiln; and the deposition rate of the volatile compounds at the inner walls of the rotary kiln forming a ring, wherein the volatile compounds iteratively experience change in state parameters along the length of the rotary kiln causing deposition and re-circulation; and aggregating, via the one or more hardware processors, by a ring model executed by the one or more hardware processors, the set of height parameters, the gaseous phase parameters, the temperature parameter, the energy parameter, the interaction parameters, and the state parameters to estimate ring thickness, net ring growth and strength of the deposited material in the rotary kiln to predict safe time of operation of the rotary kiln.

16. The one or more non-transitory machine-readable information storage mediums of claim 15, wherein plurality of design parameters comprises of kiln tilt angle, angle of repose for solid material, the radius of the rotary kiln and rotational speed of the kiln and wherein operational parameters comprises of solid feed rate, solid particle size distribution, solid chemical composition, temperature of kiln at the feed end, discharge end, at the middle, within the lumen of the kiln and near the walls of the rotary kiln.

17. The one or more non-transitory machine-readable information storage mediums of claim 15, wherein the solid bed height variation model estimates the height of the solid bed by assuming a certain bed height at the discharge end as an initial condition and subsequently calculating the solid bed height parameters along the length that varies from the discharge end to the feed end, and wherein the solid bed height parameters predicts cross-section area of the solid stream, gas stream and available interfacial heat transfer area in between solids, gases and kiln walls.

18. The one or more non-transitory machine-readable information storage mediums of claim 15, wherein the gas stream model calculates reaction kinetics of the plurality of gaseous components of the gas stream to obtain overall heat balance, wherein a part of gaseous components is introduced through a fuel injected from the discharge end and a part of gaseous components are obtained through the reactions of the solid bed triggered by high kiln temperature.

19. The one or more non-transitory machine-readable information storage mediums of claim 15, wherein the melt model estimates the rate of formation of the molten phase as the solid feed travels towards discharge end wherein a rate of molten phase formation is calculated by:

$$\frac{dL}{dt} = \frac{K_{corr} N_0 \left(4\pi R_{mean}^2\right) K_l (T_b - T_s)}{\lambda Q_s}$$

and wherein, numerator term represents the total energy received by the solid bed having solidus temperature and the denominator represents the total energy required by the total available solid material in the kiln along the length, and wherein the aggregation model estimates the particle size distribution of a continuous system preserving the solid volume utilizing a coalescence kernel given by:

$$\text{coalescence kernel } (\beta_{i,j}) = \text{amount of melt fraction} \times k_g$$

wherein, $k_g$ is the calibration factor.

20. The one or more non-transitory machine-readable information storage mediums of claim 15, wherein the gaseous component of the gas stream is a fuel introduced to the rotary kiln from the discharge end or is a gas mixture introduced to the kiln or the volatile compounds and other gaseous components present in the solid bed and released in the temperature triggered solid bed reaction or a mixture of above three, and wherein, the net flow rate of the volatile compounds inside the rotary kiln is calculated by adding (i) net deposition rate of volatile compounds at the inner walls of the rotary kiln, (ii) circulation rate of low melting volatile compounds evaporating with the increasing temperature of the solid bed along the length of the kiln and re-circulating with gas stream in the kiln, and (iii) the high boiling volatile compounds remained trapped in the solid bed and exiting along with the discharged product, and wherein the solid bed height variation model, the solid stream model, the melt model, the aggregation model and the volatile model perform estimations along the length of the rotary kiln, from the feed end towards the discharge end; and the gas stream model perform estimations along the length of the rotary kiln, from the discharge end towards the feed end.

* * * * *